(12) United States Patent
Lewis et al.

(10) Patent No.: US 9,565,224 B1
(45) Date of Patent: Feb. 7, 2017

(54) METHODS, SYSTEMS, AND MEDIA FOR PRESENTING A CUSTOMIZED USER INTERFACE BASED ON USER ACTIONS

(71) Applicant: Google Inc., Mountain View, CA (US)

(72) Inventors: Justin Lewis, Marina del Ray, CA (US); Ruxandra Georgiana Paun, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 14/145,325

(22) Filed: Dec. 31, 2013

(51) Int. Cl.
*G06F 3/048* (2013.01)
*H04L 29/06* (2006.01)
*G06F 3/0484* (2013.01)

(52) U.S. Cl.
CPC ......... *H04L 65/403* (2013.01); *G06F 3/04842* (2013.01)

(58) Field of Classification Search
CPC ............ G06F 3/04842; G06F 17/30867; G06F 17/3053; G06F 17/30038; H04L 51/32; G06Q 50/01; G06Q 20/223; G06Q 30/0277
USPC ................................ 715/719, 738, 744, 745
See application file for complete search history.

(56) References Cited

U.S. PATENT DOCUMENTS

| | | | | |
|---|---|---|---|---|
| 2005/0266835 A1* | 12/2005 | Agrawal | ................ | G06Q 10/10 455/414.3 |
| 2009/0144392 A1* | 6/2009 | Wang | ................... | G06Q 10/10 709/217 |
| 2009/0165140 A1* | 6/2009 | Robinson | ............... | G06Q 30/02 726/26 |
| 2010/0306249 A1* | 12/2010 | Hill | ................... | G06F 17/30867 707/769 |
| 2011/0282944 A1* | 11/2011 | Henderson | ............. | G06Q 10/06 709/204 |
| 2012/0109836 A1* | 5/2012 | Chen | ...................... | G06Q 10/10 705/319 |
| 2012/0110064 A1* | 5/2012 | Chen | ...................... | G06Q 10/10 709/203 |
| 2012/0136934 A1* | 5/2012 | Patil | ...................... | G06Q 10/10 709/204 |
| 2012/0166544 A1* | 6/2012 | Wilder | ............. | G06F 17/30525 709/204 |
| 2012/0284343 A1* | 11/2012 | Lee | ........................ | G06Q 50/01 709/206 |
| 2013/0073623 A1* | 3/2013 | Nguyen | ........... | H04N 21/23103 709/204 |

(Continued)

*Primary Examiner* — Tadeese Hailu
(74) *Attorney, Agent, or Firm* — Byrne Poh LLP

(57) ABSTRACT

Methods, systems, and media for presenting a customized user interface based on user actions are provided. In some implementations, a method for presenting a customized user interface based on user actions is provided, the method comprising: receiving a request for media content from an application comprising a user interface for presenting media content that includes a plurality of user interface elements that each initiate sharing on a different platform; determining that the request was sent from the user device as a result of the user selecting a link on a first platform; and causing the application to present an additional user interface element that initiates sharing of the media content item on the first platform in addition to the plurality of user interface elements in response to determining that the request was transmitted as a result of selection of the link on the first platform.

24 Claims, 10 Drawing Sheets

(56) References Cited

U.S. PATENT DOCUMENTS

| | | | | |
|---|---|---|---|---|
| 2013/0268829 A1* | 10/2013 | Lansford | ........... | G06F 17/30014 715/205 |
| 2013/0302005 A1* | 11/2013 | Harwell | ............. | H04N 21/2408 386/200 |
| 2013/0346877 A1* | 12/2013 | Borovoy | ............... | H04L 65/403 715/753 |
| 2014/0026201 A1* | 1/2014 | Srinivasan | ............. | G06Q 50/01 726/7 |
| 2014/0173467 A1* | 6/2014 | Clavel | ................ | H04L 12/1822 715/758 |
| 2014/0222531 A1* | 8/2014 | Jacobs | ................... | G06Q 50/01 705/14.5 |
| 2014/0229231 A1* | 8/2014 | Lynn | .................. | G06Q 30/0201 705/7.29 |
| 2014/0229544 A1* | 8/2014 | Evans | .................... | G06Q 50/01 709/204 |
| 2014/0249244 A1* | 9/2014 | Chappellet | ............ | C07C 229/60 522/176 |
| 2014/0325359 A1* | 10/2014 | Vehovsky | ............ | H04N 9/8205 715/723 |
| 2014/0351346 A1* | 11/2014 | Barton | .................... | H04L 51/00 709/206 |
| 2015/0220499 A1* | 8/2015 | Katic | ................ | G06F 17/30899 715/207 |
| 2016/0117332 A1* | 4/2016 | Oztaskent | ........... | G06F 17/3053 707/725 |

* cited by examiner

METHODS, SYSTEMS, AND MEDIA FOR PRESENTING A CUSTOMIZED USER INTERFACE BASED ON USER ACTIONS

TECHNICAL FIELD

The disclosed subject matter relates to methods, systems, and media for presenting a customized user interface based on user actions.

BACKGROUND

When viewing or otherwise consuming media content, such as videos, articles, images, etc., from a site that publishes the content, users are often encouraged to share that media content with others. For example, a user can share media content with other users that are connected to the user through a social networking service, or with other members of an online community which the user participates in. Sharing is often facilitated by providing a button or other user interface element in a user interface for consuming content that initiates sharing to a specific service or community. However, the user interface elements that are presented to the user and the sites which those user interface elements correspond to are often fixed. That is, the sites that are available to the user are often selected based on the overall popularity of the sites, or based on which sites an administrator of the site publishing the media content finds the most appealing.

Accordingly, it is desirable to provide methods, systems, and media for presenting a customized user interface based on user actions.

SUMMARY

In accordance with various embodiments of the disclosed subject matter, methods, systems, and media for presenting a customized user interface based on user actions are provided.

In accordance with some embodiments of the disclosed subject matter, a method for presenting a customized user interface based on user actions is provided, the method comprising: receiving, using a hardware processor, a request for a media content item from an application running on a user device, wherein the application comprises a user interface for presenting the media content item that includes a plurality of user interface elements that each initiate sharing of the media content item on one of a plurality of platforms upon selection of the corresponding user interface element; determining that the request was sent from the user device as a result of the user selecting a link on a first platform of the plurality of platforms; and causing the application to present an additional user interface element that causes the user device to initiate sharing of the media content item on the first platform in response to selection of the additional user interface element in the user interface for presenting the media content item in addition to the plurality of user interface elements based on the determination that the request was transmitted as a result of the user selecting the link on the first platform.

In accordance with some embodiments of the disclosed subject matter, a system for presenting a customized user interface based on user actions is provided, the system comprising: a hardware processor programmed to: receive a request for a media content item from an application running on a user device, wherein the application comprises a user interface for presenting the media content item that includes a plurality of user interface elements that each initiate sharing of the media content item on one of a plurality of platforms upon selection of the corresponding user interface element; determine that the request was sent from the user device as a result of the user selecting a link on a first platform of the plurality of platforms; and cause the application to present an additional user interface element that causes the user device to initiate sharing of the media content item on the first platform in response to selection of the additional user interface element in the user interface for presenting the media content item in addition to the plurality of user interface elements based on the determination that the request was transmitted as a result of the user selecting the link on the first platform.

In accordance with some embodiments of the disclosed subject matter, a non-transitory computer-readable medium containing computer executable instructions that, when executed by a processor, cause the processor to perform a method for presenting a customized user interface based on user actions is provided, the method comprising: receiving a request for a media content item from an application running on a user device, wherein the application comprises a user interface for presenting the media content item that includes a plurality of user interface elements that each initiate sharing of the media content item on one of a plurality of platforms upon selection of the corresponding user interface element; determining that the request was sent from the user device as a result of the user selecting a link on a first platform of the plurality of platforms; and causing the application to present an additional user interface element that causes the user device to initiate sharing of the media content item on the first platform in response to selection of the additional user interface element in the user interface for presenting the media content item in addition to the plurality of user interface elements based on the determination that the request was transmitted as a result of the user selecting the link on the first platform.

In accordance with some embodiments of the disclosed subject matter, a system for presenting a customized user interface based on user actions is provided, the system comprising: means for receiving a request for a media content item from an application running on a user device, wherein the application comprises a user interface for presenting the media content item that includes a plurality of user interface elements that each initiate sharing of the media content item on one of a plurality of platforms upon selection of the corresponding user interface element; means for determining that the request was sent from the user device as a result of the user selecting a link on a first platform of the plurality of platforms; and means for causing the application to present an additional user interface element that causes the user device to initiate sharing of the media content item on the first platform in response to selection of the additional user interface element in the user interface for presenting the media content item in addition to the plurality of user interface elements based on the determination that the request was transmitted as a result of the user selecting the link on the first platform.

In some embodiments, the additional user interface element comprises a logo of the first platform.

In some embodiments, the additional user interface element comprises text including a name of the first platform.

In some embodiments, the application is a browser application.

In some embodiments, at least one of the plurality of platforms is a social networking service.

In some embodiments, the means for determining determines that the request was sent from the user device as a result of the user selecting the link on the first platform is based on information in an HTTP header associated with the request.

In some embodiments, the system further comprises means for determining an amount of time for which the media content item has been available, wherein presentation of the additional user interface is also based on whether the amount of time is below a predetermined threshold.

In some embodiments, the system further comprises means for determining that the user has shared a media content item to the first platform within a predetermined period of time, wherein presentation of the additional user interface is also based on the determination that the user has shared a media content item to the first platform within the predetermined time period.

In accordance with some embodiments of the disclosed subject matter a method for presenting a customized user interface based on user actions is provided, the method comprising: detecting, using a hardware processor, sharing of media content from a media content platform by a user to one or more platforms; detecting a source of incoming links to media content items on the media content platform selected by the user on one of the one or more platforms; receiving a request for a media content item from an application that is running on a user device and that is associated with the user; selecting a subset of user interface elements that each initiate sharing of the media content item on one of the one or more platforms upon selection of the corresponding user interface element from a set of user interface elements each corresponding to a platform for presentation as part of a user interface of the application running on the user device based on at least the detected sharing behavior of the user and the detected sources of incoming links selected by the user; and causing the user interface of the application running on the user device to present the subset of user interface elements in association with the requested media content item.

In some embodiments, the method further comprises determining location information of the user device, wherein the set of user interface elements is chosen from the one or more user interface elements in a region associated with the location information of the user device.

In some embodiments, the method further comprises detecting requests for media content originating from each of the platforms of the set of platforms that result from selection of links shared by the user, wherein selection of the subset of user interface elements is also based on the number of requests for media from each of the platforms of the set of platforms that result from selection of links shared by the user.

In some embodiments, the method further comprises: determining location information of the user device; determining a popularity of each of the platforms associated with user interface elements that are not included in the subset in a region associated with the location information; and selecting a second subset of user interface elements of the set of user interface elements to be included in the user interface of the application running on the user device based on the popularity of the platform associated with each user interface element, wherein the second subset is selected from remaining platforms of the set of user interface elements after selecting the subset of user interface elements.

In some embodiments, the subset of user interface elements is presented upon loading the item of content, and the second subset of user interface elements is presented in the user interface of the application upon user selection of a share section of the user interface.

In some embodiments, at least one of the user interface elements of the set of user interface elements comprises a logo of the platform to which the at least one user interface element corresponds.

In some embodiments, the platform that at least one of the user interface elements of the set of user interface elements corresponds to is a social networking service.

In some embodiments, the method further comprises determining that the user is signed in to a particular social networking service that has an association with the media content platform, wherein the subset of user interface elements selected is also based on the determination that the user is signed in to the particular social networking service.

In some embodiments, an order in which the subset of user interface elements is presented is based on a combination of whether the user is signed in to the particular social networking service, a recency of detected activity associated with each of the one or more platforms other than the particular social networking service, and aggregate detected activity associated with the each of the one or more platforms other than the particular social networking service over a predetermined period of time prior to a current time.

In accordance with some embodiments, a system for presenting a customized user interface based on user actions is provided, the system comprising: a hardware processor programmed to: detect sharing of media content from a media content platform by a user to one or more platforms; detect a source of incoming links to media content items on the media content platform selected by the user on one of the one or more platforms; receive a request for a media content item from an application that is running on a user device and that is associated with the user; select a subset of user interface elements that each initiate sharing of the media content item on one of the one or more platforms upon selection of the corresponding user interface element from a set of user interface elements each corresponding to a platform for presentation as part of a user interface of the application running on the user device based on at least the detected sharing behavior of the user and the detected sources of incoming links selected by the user; and cause the user interface of the application running on the user device to present the subset of user interface elements in association with the requested media content item.

In some embodiments, the hardware processor is further programmed to determine location information of the user device, wherein the set of user interface elements is chosen from the one or more user interface elements in a region associated with the location information of the user device.

In some embodiments, the hardware processor is further programmed to detect requests for media content originating from each of the platforms of the set of platforms that result from selection of links shared by the user, wherein selection of the subset of user interface elements is also based on the number of requests for media from each of the platforms of the set of platforms that result from selection of links shared by the user.

In some embodiments, the hardware processor is further programmed to: determine location information of the user device; determine a popularity of each of the platforms associated with user interface elements that are not included in the subset in a region associated with the location information; and select a second subset of user interface elements of the set of user interface elements to be included in the user interface of the application running on the user device based on the popularity of the platform associated with each user interface element, wherein the second subset is selected from remaining platforms of the set of user interface elements after selecting the subset of user interface elements.

In some embodiments, the subset of user interface elements is presented upon loading the item of content, and the second subset of user interface elements is presented in the user interface of the application upon user selection of a share section of the user interface.

In some embodiments, at least one of the user interface elements of the set of user interface elements comprises a logo of the platform to which the at least one user interface element corresponds.

In some embodiments, the platform that at least one of the user interface elements of the set of user interface elements corresponds to is a social networking service.

In some embodiments, the hardware processor is further programmed to determine that the user is signed in to a particular social networking service that has an association with the media content platform, wherein the subset of user interface elements selected is also based on the determination that the user is signed in to the particular social networking service.

In some embodiments, an order in which the subset of user interface elements is presented is based on a combination of whether the user is signed in to the particular social networking service, a recency of detected activity associated with each of the one or more platforms other than the particular social networking service, and aggregate detected activity associated with the each of the one or more platforms other than the particular social networking service over a predetermined period of time prior to a current time.

In accordance with some embodiments of the disclosed subject matter, a non-transitory computer-readable medium containing computer executable instructions that, when executed by a processor, cause the processor to perform a method for presenting a customized user interface based on user actions, the method for presenting a customized user interface based on user actions is provided, the method comprising: detecting sharing of media content from a media content platform by a user to one or more platforms; detecting a source of incoming links to media content items on the media content platform selected by the user on one of the one or more platforms; receiving a request for a media content item from an application that is running on a user device and that is associated with the user; selecting a subset of user interface elements that each initiate sharing of the media content item on one of the one or more platforms upon selection of the corresponding user interface element from a set of user interface elements each corresponding to a platform for presentation as part of a user interface of the application running on the user device based on at least the detected sharing behavior of the user and the detected sources of incoming links selected by the user; and causing the user interface of the application running on the user device to present the subset of user interface elements in association with the requested media content item.

In accordance with some embodiments of the disclosed subject matter a system for presenting a customized user interface based on user actions is provided, the system comprising: means for detecting sharing of media content from a media content platform by a user to one or more platforms; means for detecting a source of incoming links to media content items on the media content platform selected by the user on one of the one or more platforms; means for receiving a request for a media content item from an application that is running on a user device and that is associated with the user; selecting a subset of user interface elements that each initiate sharing of the media content item on one of the one or more platforms upon selection of the corresponding user interface element from a set of user interface elements each corresponding to a platform for presentation as part of a user interface of the application running on the user device based on at least the detected sharing behavior of the user and the detected sources of incoming links selected by the user; and means for causing the user interface of the application running on the user device to present the subset of user interface elements in association with the requested media content item.

In some embodiments, the system further comprises means for determining location information of the user device, wherein the set of user interface elements is chosen from the one or more user interface elements in a region associated with the location information of the user device.

In some embodiments, the system further comprises means for detecting requests for media content originating from each of the platforms of the set of platforms that result from selection of links shared by the user, wherein selection of the subset of user interface elements is also based on the number of requests for media from each of the platforms of the set of platforms that result from selection of links shared by the user.

In some embodiments, the system further comprises: means for determining location information of the user device; means for determining a popularity of each of the platforms associated with user interface elements that are not included in the subset in a region associated with the location information; and means for selecting a second subset of user interface elements of the set of user interface elements to be included in the user interface of the application running on the user device based on the popularity of the platform associated with each user interface element, wherein the second subset is selected from remaining platforms of the set of user interface elements after selecting the subset of user interface elements.

In some embodiments, the subset of user interface elements is presented upon loading the item of content, and the second subset of user interface elements is presented in the user interface of the application upon user selection of a share section of the user interface.

In some embodiments, at least one of the user interface elements of the set of user interface elements comprises a logo of the platform to which the at least one user interface element corresponds.

In some embodiments, the platform that at least one of the user interface elements of the set of user interface elements corresponds to is a social networking service.

In some embodiments, the system further comprises means for determining that the user is signed in to a particular social networking service that has an association with the media content platform, wherein the subset of user interface elements selected is also based on the determination that the user is signed in to the particular social networking service.

In some embodiments, an order in which the subset of user interface elements is presented is based on a combination of whether the user is signed in to the particular social networking service, a recency of detected activity associated with each of the one or more platforms other than the particular social networking service, and aggregate detected activity associated with the each of the one or more platforms other than the particular social networking service over a predetermined period of time prior to a current time.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
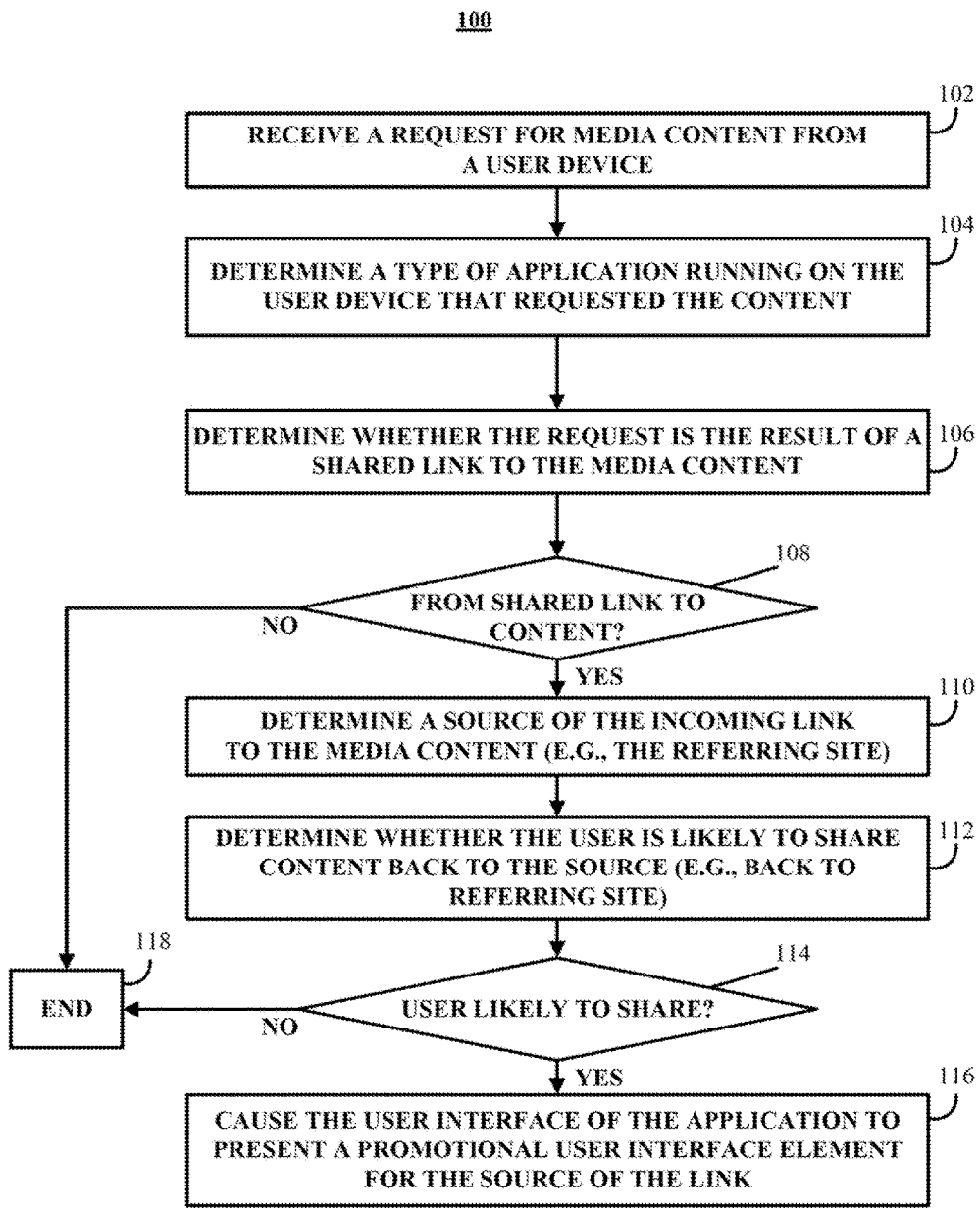
FIG. 1 shows an example of a process for presenting a customized user interface based on user actions in accordance with some embodiments of the disclosed subject matter.

In accordance with various embodiments, mechanisms (which can include methods, systems, and/or media) for presenting a customized user interface based on user actions are provided.

In some embodiments, the mechanisms described herein can cause a user interface for presenting media content (e.g., videos, audio, images, articles, text, blog posts, etc.) from a media content platform (e.g., a source of the media content) to include one or more promotional user interface elements that initiate sharing of the media content. For example, the mechanisms described herein can determine whether an incoming request for media content is the result of a user selecting a shared link to the media content. In this example, upon determining that the request is the result of the selection of a shared link, the mechanisms described herein can identify a platform where the request originated (e.g., a web site or other service that caused the shared link to be presented to the user). After identifying the platform where the request originated, the mechanisms described herein can cause a user interface for presenting the requested media content to include a promotional user interface element. Selection of the promotional user interface element (e.g., by a user "clicking" on the promotional user interface, or any other suitable technique for selecting a user interface element) can initiate sharing of media content that is currently being presented to the user. In this example, the mechanisms described herein can facilitate the sharing of content from a media content platform using the mechanisms described herein. In some embodiments, such sharing can increase the total amount of media content that is requested from the media platform, which can in turn increase revenue associated with consumption of such media content.

In a more particular example, a user can access a social messaging service using a full featured web browser on a laptop computer. The user of the social messaging service can be presented with a link to a video entitled "kitten playing soccer" that was shared by another user of the social messaging service that is a connection of the user as a part of the social messaging service as presented to the user using the web browser. The user can then select the link (e.g., by "clicking" on the link), which can cause the web browser to navigate to the linked video by requesting the video from a video platform using the mechanisms described herein. The video platform can receive the request and determine that the request was initiated from a shared link on the social messaging service. Upon causing "kitten playing soccer" to be presented by the web browser, the video platform can also cause a promotional share element (e.g., a promotional share button) to be loaded as part of the user interface for presenting "kitten playing soccer" using the web browser. This promotional share button can include a logo and/or name of the social messaging service and a message to share the currently playing video using the social messaging service. If the user requests another video after watching all or part of "kitten playing soccer," the video platform can continue to present the promotional share button. This can encourage the user to share videos back to the social messaging service, which can increase the total number of videos watched by the user and/or connections of the user on the social messaging service.

In some embodiments, the mechanisms described herein can cause a user interface for presenting media content from a media content platform to present user interface elements for initiating sharing of the media content in a ranked order based on detected user actions. For example, the mechanisms described herein can aggregate detected user actions related to various platforms for sharing content (e.g., social networking services, social aggregation platforms, blogging or microblogging platforms, etc.). Such detected actions can include sharing content to such platforms, requesting content using shared links previously shared to such platforms (e.g., by the user or another user), requests for media content that originated from a shared link to the content that was shared by the user, and/or any other suitable actions. In such an example, when a request for media content is received from a particular user (or user device), user interface elements that initiate sharing of the media content to one or more platforms can be ranked based on the aggregated detected activity. Such ranking can place user interface elements that correspond to platforms used more frequently by the user in a more prominent position, place a user interface element that corresponds to a platform that generates more requests when shared by the user in a more prominent position, and/or can be ranked using any other suitable criteria.

In some embodiments, after ranking the user interface elements, the mechanisms described herein can cause the ranked user interface elements to be presented to the user based on the ranking. In such an example, the mechanisms described herein can facilitate sharing of content from a media content platform to platforms that the user is more likely to use (e.g., based on observed behavior of the user), to platforms that are likely to generate more requests for the content by other users when shared by the user, and/or to platforms determined to accomplish any other suitable objectives of the media content platform. Although sharing of content is generally described herein in terms of sharing a link to the content, sharing can also be accomplished in other ways. For example, media content can shared to a platform by embedding the content on such a platform. In such an example, embedded media content can be consumed within the platform (e.g., a video can be played within a web page of a social networking service), rather than requiring that the media content platform be opened and/or navigated to by the user device prior to accessing the media content. Note that the mechanisms described herein can be used with embedded media content using any suitable technique or techniques for presenting user interface elements for sharing the embedded content on any suitable platform.

In a more particular example, a user of various platforms (e.g., a social networking service, a microblogging service, and a social aggregation platform) can perform actions associated with all three platforms and a particular media content platform (e.g., a video platform). The user can, for example, share a video to the social networking service, watch an embedded video on the social aggregation platform and rank the embedded video, request that a video be presented by selecting a shared link to the video on the microblogging service, etc. The mechanisms described herein can be used by the video platform to detect these various activities. The video platform can use the mechanisms to rank the platforms used by the user based on these detected activities. In this case, the mechanisms can determine that the microblogging service is ranked first because the user most recently shared a video to the microblogging service. The mechanisms can then cause a share button associated with the microblogging service to be presented to the user in a more prominent position than share buttons for the social networking service and the social aggregation platform. However, share buttons for the social networking service and the social aggregation platform can be presented more prominently than share buttons for other platforms and/or services for which no activity was detected for the user.

It should be noted that, in situations in which the mechanisms described herein collect personal information about users, or can make use of personal information, the users can be provided with an opportunity to control whether programs or features collect user information (e.g., information about user actions stored on a user device, information about user actions stored on a remote device, etc.), or to control whether and/or how to receive instructions from the server to cause a user interface presented to the user to be customized based on user actions. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

Turning to FIG. 1, an example of a process 100 for presenting a customized user interface based on user actions is shown in accordance with some embodiments of the disclosed subject matter. At 102, process 100 can receive a request for media content from a user device. In some embodiments, process 100 can receive the request for media content in any suitable form. For example, process 100 can receive the request for media content from the user device over a network such as the Internet. As another example, process 100 can receive an indication that the request for content has been received by another process, such as a process for receiving requests for media content and initiating presentation of that content to a user device. In a more particular example, information included in the request for content can be redirected to process 100. Additionally or alternatively, process 100 can run in parallel to a process or processes for receiving requests for content, responding to requests for content, initiating presentation of content in response to a request for content, etc., on the same device or a different device, which can be located locally to each other or remote from each other.

In some embodiments, process 100 can receive the request at 102 as part of a media content platform that causes media content to be presented to a user in response to a request for media content. For example, the media content platform can include a video sharing or video publishing service that facilitates sharing of video from a user posting the video to other users that can request and then watch the video. As another example, the media content platform can include a content publisher that publishes media content such as articles, reviews, news, etc., which can include text, images, audio, video, and/or any other suitable media content.

In some embodiments, the request can be received at 102 in response to any suitable user action that causes the request to be issued. For example, the request can be issued in response to a user entering a uniform resource locator (URL) that corresponds to the content into a web browser or similar application. As another example, the request can be issued in response to the user selecting a hyperlink within a user interface of a web browser or similar application. As yet another example, the request can be issued in response to selecting media content in a media content viewing application, such as an application for discovering and presenting video content.

In some embodiments, the request for content can include various information related to a user device requesting the content, information related to an application causing the user device to request the content, information related to past actions by the user and/or user device in connection with the media content platform receiving the request for content at 102, a source of the request (e.g., a web site or other platform from which a link was selected), etc.

At 104, process 100 can determine a type of application running on the user device that requested the content. For example, process 100 can determine whether the request was issued from a full feature web browser application (e.g., a web browser for a personal computer, a laptop computer, etc.), from a limited feature web browser application (e.g., a web browser for certain mobile devices such as for use in smartphones, tablet computers, wearable computers, etc.), from an application associated with the media content platform (e.g., an application published or endorsed by the owner of the media content platform for accessing media content from the media content platform), etc.

At 106, process 100 can determine whether the request was issued as a result of a shared link to the media content. For example, links to the media content can be shared by users in various ways and/or to various platforms. For example, a user can use a "share" user interface element in a user interface of the media content platform (e.g., as described below in connection with FIGS. 2A-2C, 3, 5 and 6) to share a link to a particular platform. As another example, a user can copy an address for a link to the media content from an address bar or from a sharing section of a user interface of the media content platform and insert the link into a particular platform.

In some embodiments, a platform to which content is shared can include any suitable platform for sharing content with others. For example, a platform can be a social networking service that connects users to one another and that allows users to post content that is made available for viewing by other users of the social networking service.

Such posted content can be shared with others automatically (e.g., as part of a news feed or other update that is automatically presented to users connected to the user sharing the content), can be shared in response to other users requesting presentation of content posted by the user, can be sent to certain users for presentation in response to the user identifying those users (e.g., the content can be sent in an email, in an instant message, a link to the content can be sent to other users in response to the user identifying those users as being associated with the posted content using any suitable technique or techniques such as by tagging other users, etc.), or can be shared on a social networking service using any other suitable technique or techniques.

As another example, a platform can be a blogging or microblogging platform that facilitates users publishing content to be consumed by other users. Such other users can be connected to the user publishing the content (e.g., as a follower, as a subscriber, etc.), or unconnected to the user publishing the content (e.g., the other user can access the content by entering a URL of the blog or microblog, entering a URL of a particular item of content published on the blog or microblog, selecting a link to the content on another platform, etc.).

As yet another example, a platform can be a social aggregation platform that facilitates the sharing of media content by users and/or ranking of such media content by the users of the social aggregation platform. The sharing and/or ranking of media content can be performed using any suitable technique or techniques.

As still another example, a platform can include aspects of various platforms such as social networking services, blogs or microblogs, social aggregation platforms, and/or any other suitable platform for sharing with others.

In some embodiments, process 100 can determine whether the request was issued by the user device in response to selection of a shared link to the requested media content using any suitable technique or techniques. For example, the request can include information related to the source of the request (e.g., a referring site) in metadata of the request (e.g., in a "referrer" field of an HTTP header generated in response to selection of the link). As another example, when a user shares media content from the media content platform (e.g., by selecting a share element), the media content platform can generate a unique link address for each different platform to which the user selects to share the media content, and store these addresses in association with the platforms to which they correspond. In such an example, when a request is received for media content at one of these unique addresses, process 100 can determine the source of the request based on the correspondence between the unique address and the platform that was stored when the address was created. As yet another example, when a user shares media content from the media content platform (e.g., by selecting a share element), the media content platform can include identifying information in the link address, where the identifying information corresponds to the platform to which the link is shared. In such an example, when a request is received for media content, process 100 can determine whether the address that is being requested includes identifying information corresponding to a platform and identify the platform that is the source of the request based on the identifying information.

In some embodiments, process 100 determines that the request is the result of a shared link if the source of the request is determined to be a platform from a set of platforms used to share content. For example, process 100 can determine that the request is the result of a shared link if the source of the request corresponds to a platform for which a share user interface element (e.g., a share element) is included in the user interface of the media content platform. As a more particular example, the media content platform can include share elements in a user interface for presenting content (note that the share elements can be located at a top level of the user interface, in a share portion of the user interface, or any other suitable location). In such an example, selecting one of the share elements can initiate sharing of the media content being presented in the user interface to a platform corresponding to the selected share element. Further, in such an example, process 100 can determine that the source of the request is a shared link if the source of the request is a platform that corresponds to one of the share elements. Additionally, a subset of the platforms that correspond to share elements can be omitted when determining whether the source of the request is a shared link. For example, process 100 can consider requests that come from platforms where a large proportion of the users are not content providers but are commenters and/or passive consumers of content to not be requests caused by shared links to the media content. Users of these platforms may be unlikely to share content back to such platforms.

If process 100 determines that the request is the result of a shared link ("YES" at 108), process 100 can proceed to 110. Otherwise, if process 100 determines that the request is not the result of a shared link ("NO" at 108), process 100 can proceed to 118 where process 100 can end.

At 110, process 100 can determine a source of the incoming link to the media content. In some embodiments, as described above in connection with 106, this information can be determined by process 100 when determining if the request is the result of a shared link. Additionally, any suitable technique or techniques, such as those described above in connection with 106 can be used to determine the source of the incoming link to the media content (which is sometimes referred to herein as a referring site). Additionally, in some embodiments, determining whether the request is the result of a shared link at 106, and determining the source of the incoming link at 110 can be combined or performed in parallel, and are not necessarily performed in the order presented in FIG. 1.

At 112, process 100 can determine whether the user is likely to share content back to the source of the request. In some embodiments, any suitable criteria and/or information can be used to evaluate whether the user is likely to share content back to the source of the request. For example, a user's sharing actions can be detected (e.g., as described below in connection with FIG. 4), and process 100 can determine that a user that shared media content in the past is a user that is likely to share media content. In this example, detecting can be aggregated across platforms or can be performed on a per-platform basis. As another example, a number of times the user has been presented with a promotional share element (e.g., as described below in connection with 116 of FIG. 1) can be detected. In such an example, if the user has not initiated sharing of media content using the promotional share element after being presented with the promotional share element a threshold number of times (e.g., three times, ten times, etc.), process 100 can determine that the user is unlikely to share media content. Note that, in some embodiments, the number of times that a user has been presented with a promotional share element can be tracked for each platform and/or aggregated across platforms. In yet another example, detecting user actions and/or aggregating detected user actions can be performed by a process being executed by an aggregation service that can be unaffiliated with a platform using the mechanisms described herein. In this example, process 100 can submit a query that includes user information associated with the user that requested the content to the aggregation service, which can return information about the user's likelihood of sharing the content, or any other suitable information.

In some embodiments, in addition to determining if the user is likely to share media content, process 100 can present the promotional share element in any other suitable circumstances. For example, process 100 can cause the promotional share element to be presented to a user if the user is determined to be unlikely to share (e.g., because the user does not share media content regularly, because the user has not used a presented promotional share element after being presented with the promotional share element the threshold number of times, etc.). As another example, process 100 can cause the promotional share element to be presented to a user that has not been presented with a promotional share element recently (e.g., within a predetermined period of time prior to a current time, such as within the past two weeks, within the last month, or any other suitable period of time). In these examples and/or in any other suitable circumstances, process 100 can cause the promotional share element to be presented to test the user's current propensity to share media content.

If process 100 determines that the user is unlikely to share content back to the source of the referral ("NO" at 114), process 100 can proceed to 118 where process 100 can end. Otherwise, if process 100 determines that the user is likely to share content back to the source of the referral ("YES" at 114), process 100 can proceed to 116.

At 116, process 100 can cause a user interface of the application running on the user device to present a promotional user interface element corresponding to a platform determined to be the source of the request at 110. For example, process 100 can cause a promotional share element to be presented prominently in association with the media content that is presented in response to the request. As a more particular example, process 100 can cause the promotional share element to be presented in close proximity to the media content being presented, such as by causing the promotional share element to be presented adjacent to (e.g., in close proximity to) the top, bottom or side of the media content being presented. An example of a promotional share element is described below in connection with FIGS. 2A-2C.

As another example, process 100 can cause a sharing portion of a user interface for presenting the media content to be presented upon loading of the media content (e.g., if a sharing portion is normally not presented in a top level of the user interface), or upon completion of playback (or otherwise reaching the end of) the media content being presented. In such an example, process 100 can cause a promotional share element corresponding to a platform that is the source of the request to be prominently presented (e.g., by being presented first) within the share portion of the user interface in place of a normal share element for the platform that is the source of the request. An example of a promotional share element presented in a share portion of a user interface for presenting media content is described in connection with FIG. 3.

As yet another example, a promotional share element can be presented at any suitable time and/or at any suitable location. For example, a promotional share element can be presented as an overlay of the media content at any suitable time during presentation of the media content (e.g., for timed media content such as videos, the promotional share element can be presented at the beginning, at the end, during the entire duration, etc.). The foregoing are merely examples, and a promotional share element can be presented at any suitable position and at any suitable time in accordance with the disclosed subject matter.

In some embodiments, at 116, process 100 can cause any suitable instructions to be sent to the user device to cause the application running on the user device to present the promotional share element. For example, in some embodiments, process 100 can cause instructions sent to the application to be altered to include instructions for presentation of the promotional share element. In a more particular example, if the application that requested the content is a full featured web browser application, process 100 can cause code for rendering a web page for presenting the requested media content to be altered to include instructions for causing a promotional share element to be presented, including where and/or when to present such a user interface element. As another example, the application that requested the media content can include any instructions necessary for presenting a promotional share element, and process 100 can send an instruction to display a particular promotional share element. Note that the foregoing are merely examples, and any suitable instructions can be sent to the user device to cause the application to present a promotional share element.

In some embodiments, if a promotional share element is caused to be presented at 116, such a user interface element can be presented for the entirety of a user's session on the media content platform. For example, until the user navigates away from the media content platform and/or closes the application being used to present media content from the media content platform, the promotional user interface element can be presented. Alternatively, the promotional user interface element can be presented during a session in association with media content that is determined to be more shareable, but not presented during the same session in association with media content that is determined to be less shareable. For example, media content can be considered to be sharable if the media content is relatively new (e.g., less than one week old, less than one month old, less than six months old, etc.), if consumption of the media content has a generally increasing velocity (e.g., the number of views or hits of the media content is generally increasing on a daily, weekly, monthly, etc., basis), if the media content has been shared by a threshold percentage of other users that have consumed the media content, if the media content is determined to be similar to media content that generated a high degree of sharing in the past, and/or on any other suitable basis.

Figure 2A:
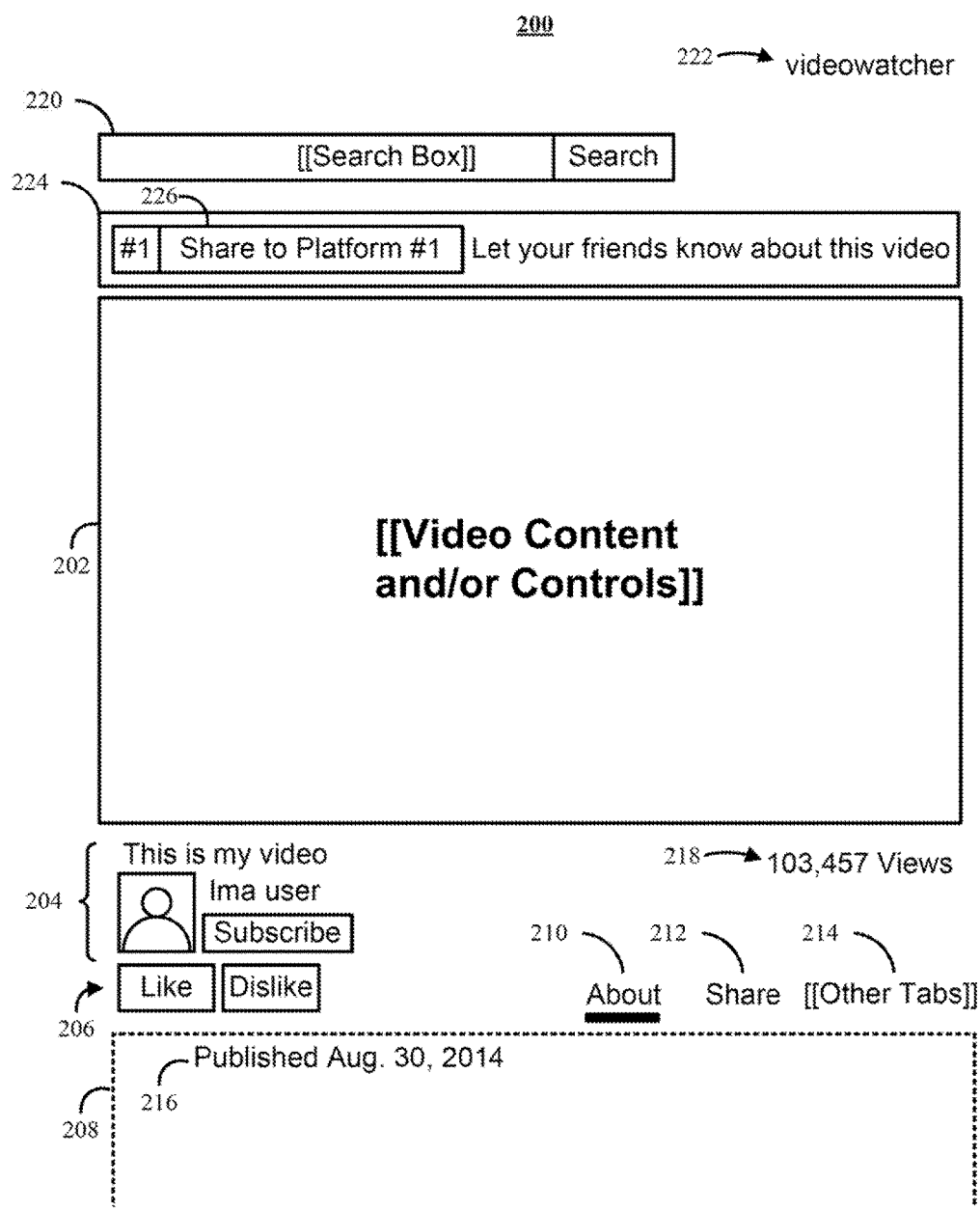
FIGS. 2A-2C and 3 show examples of a customized user interface to be presented based on user actions as a result of the process of FIG. 1 in accordance with some embodiments of the disclosed subject matter.

FIG. 2A shows an example 200 of a customized user interface that includes a promotional share element in accordance with some embodiments of the disclosed subject matter. As shown in FIG. 2A, in some embodiments, user interface 200 can include a portion 202 for presenting the media content such as a video. Media presentation portion 202 can include user interface elements for controlling playback of the media content such as a play/pause user interface element, a progress bar/positioning slider user interface element, a volume control user interface element, a screen size control user interface element, a playback quality user interface element, and/or any other suitable control user interface elements. Media presentation portion 202 can also include information related to playback, such as total time, current volume, etc. Although media presentation portion 202 is generally described in relation to playback of video information, media presentation portion 202 can be used with any suitable media content and can be configured with any suitable control user interface elements appropriate to such media content. Although the examples described herein are generally directed to video, the mechanisms described herein can be used with a platform for presenting any suitable content, such as music, images (e.g., user generated images), articles (e.g., news or magazine articles), blogs, microblogs, or any other form of content.

In some embodiments, user interface 200 can include information and/or user interface elements 204 related to the media content presented in media presentation portion 202 and/or a user associated with the media content (e.g., a user account that uploaded the media content, a user account of the owner of the content, an author of the content, etc.). In some embodiments, information and/or user interface elements 204 can include an avatar or image of the user associated with the media content, a username of the user, a title of the media content, a user interface element for subscribing to media content from the user, etc. Although a user is described herein as being associated with the media content being presented, a person or entity associated with the media content may not be a user of the media content platform. For example, if the media content platform is a media aggregation site, an author of the media content may not be a user of the media aggregation site.

In some embodiments, user interface 200 can include one or more user interface elements 206 for rating the media content. Such rating user interface elements can be any suitable user interface element or elements for rating the content. For example, as shown in FIG. 2A, rating user interface elements 206 can include a "like" and "dislike" button. As other examples, rating user interface elements 206 can include a sliding numerical scale, stars or the like (e.g., for rating out of five stars), or any other suitable user interface elements for rating the media content.

In some embodiments, user interface 200 can include an area for additional information 208 that can include various content which can change depending on a portion selected using tabs 210-214, or any other appropriate user interface elements. Tabs 210-214 can include various types of additional information and/or additional user interface elements that can be associated with the media content being presented in media presentation portion 202. In some embodiments, an about tab 210 can cause information about the video, such as a time of publishing 216, a description of the contents of the media content, tags associated with the content of the media content, links to other content, category information about the media content, etc. A share tab 212 can include share elements for sharing a link to the media content to various platforms. Any other suitable tabs 214 can include various other information and/or user interface elements for interacting with the media content, with the author of the media content, for making the media content a favorite, for reporting the media content for a violation of the media content platforms terms of service, etc.

In some embodiments, user interface 200 can include information 218 related to the popularity of the media content. For example, as shown in FIG. 2A, a number of times the media content has been viewed can be presented as popularity information. As another example, popularity information 218 can include rating information related to how users rated the content (e.g., using rating user interface elements 206. As yet another example, popularity information 218 can include a number of times the media content has been shared (e.g., using share elements presented in additional area 208 upon selecting share tab 212, or promotional share element 226, described below).

In some embodiments, user interface 200 can include a search portion 220, which can include a search box for entering a search query and a search user interface element for initiating a search based on the search query entered in the search box. In some embodiments, user interface 200 can include a username 222 of a user currently signed in to the media content platform on a user device running an application for presenting user interface 200. Additionally, if a user is not signed in, username 222 can include instructions for initiating singing in to the media content platform.

In some embodiments, user interface 200 can include a promotional share portion 224. Such a promotional user interface portion can include a promotional share element 226 and a message based on the particular platform to which promotional share element 226 corresponds. As described above in connection with FIG. 1, promotional share element 226 and promotional share portion 224 can be presented based on whether a request for the media content being presented in media presentation portion 202 was the result of selection of a shared link from the platform associated with promotional share element 226. For example, if process 100 determines at 106 and 110 that a request for the media content to be presented in media presentation portion 202 is received from a shared link on a particular platform sometimes (referred to herein generically as "platform #1"), process 100 can cause promotional share portion 224 and/or promotional share element 226 to be presented as part of user interface 200 for presenting the requested media content.

In some embodiments, selection of promotional share element 226 can initiate sharing to a corresponding platform (e.g., a social networking service, blog, microblog, social aggregation platform, etc.). Such sharing, once initiated, can require that the user sign in to an account on the platform and/or select another share element to complete sharing to the platform.

As shown in FIG. 2A, promotional share element 226 can include an icon associated with the platform (e.g., represented herein by the #1, which can be a logo of the platform) and/or a short message encouraging the user to share to the platform (e.g., "share to platform #1" as shown generically in FIG. 2A, but note that a name associated with the platform can be used). Such an icon and/or message can be presented as part of promotional share element 226 and can be selectable by the user to initiate sharing of the media content to the corresponding platform.

Additionally or alternatively, promotional share user interface portion 224 can include a message encouraging the user to share the media content. Such a message may or may not be selectable (e.g., as share element 226 is selectable), and can be customized to correspond to the platform (e.g., using language associated with the platform).

Figure 2B:
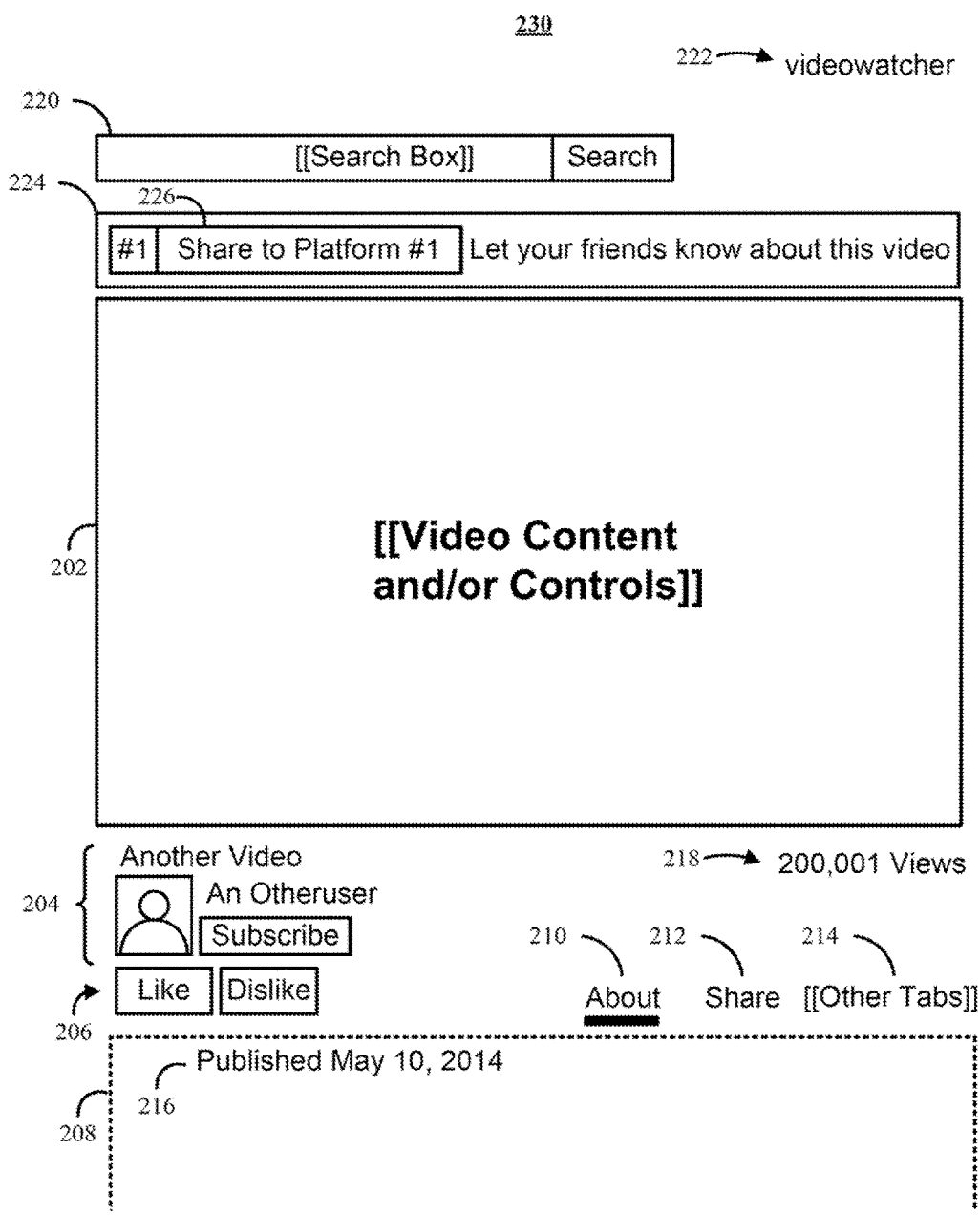

FIG. 2B shows an example 230 of a customized user interface for a second video presented in a session started by requesting a first video described in connection with example 200 after a user has navigated away from the first video. As shown in FIG. 2B, promotional user interface portion 224 can be presented in association with the media content of user interface 230. As described above in connection with FIG. 1, a promotional share element, such as promotional share element 226, can be presented to the user if the media content is determined to be sharable media content.

Figure 2C:
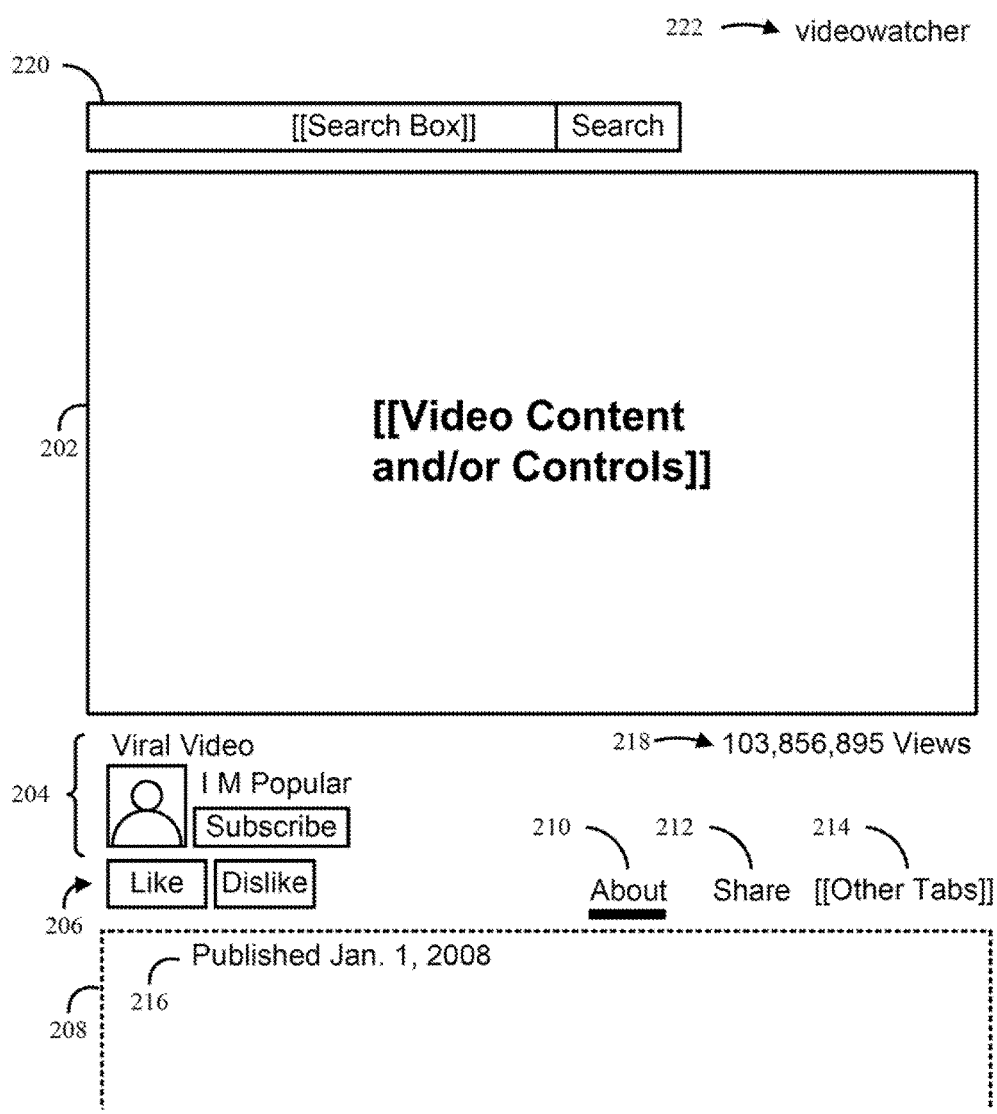

FIG. 2C shows an example 240 of a user interface for a third video presented in the session started by requesting a first video described in connection with example 200 after a user has navigated away from the first video and/or the second video described in connection with example 230. As shown in FIG. 2C, promotional user interface portion 224 can be inhibited from being presented in association with the media content of user interface 240. As described above in connection with FIG. 1, a promotional share element, such as promotional share element 226, may be inhibited from being presented to the user if the media content is determined to not be sharable media content. For example, if the media content was published outside of a predetermined period prior to a current time (e.g., more than two weeks ago, more than one month ago, etc.). As another example, a promotional share element can be inhibited from being presented after a threshold number of media content items have been presented to the user without the user selecting the promotional share element. Any suitable threshold can be used, such as two media content items, five media content items, ten media content items, etc., where the threshold can be based on known information about the user's past sharing actions (e.g., if the user has shared content in the past, the threshold number of videos with which the promotional share user interface is presented can be increased proportionally to the amount of sharing actions the user has performed, or vice versa). Other examples are described above in connection with FIG. 1.

Figure 3:
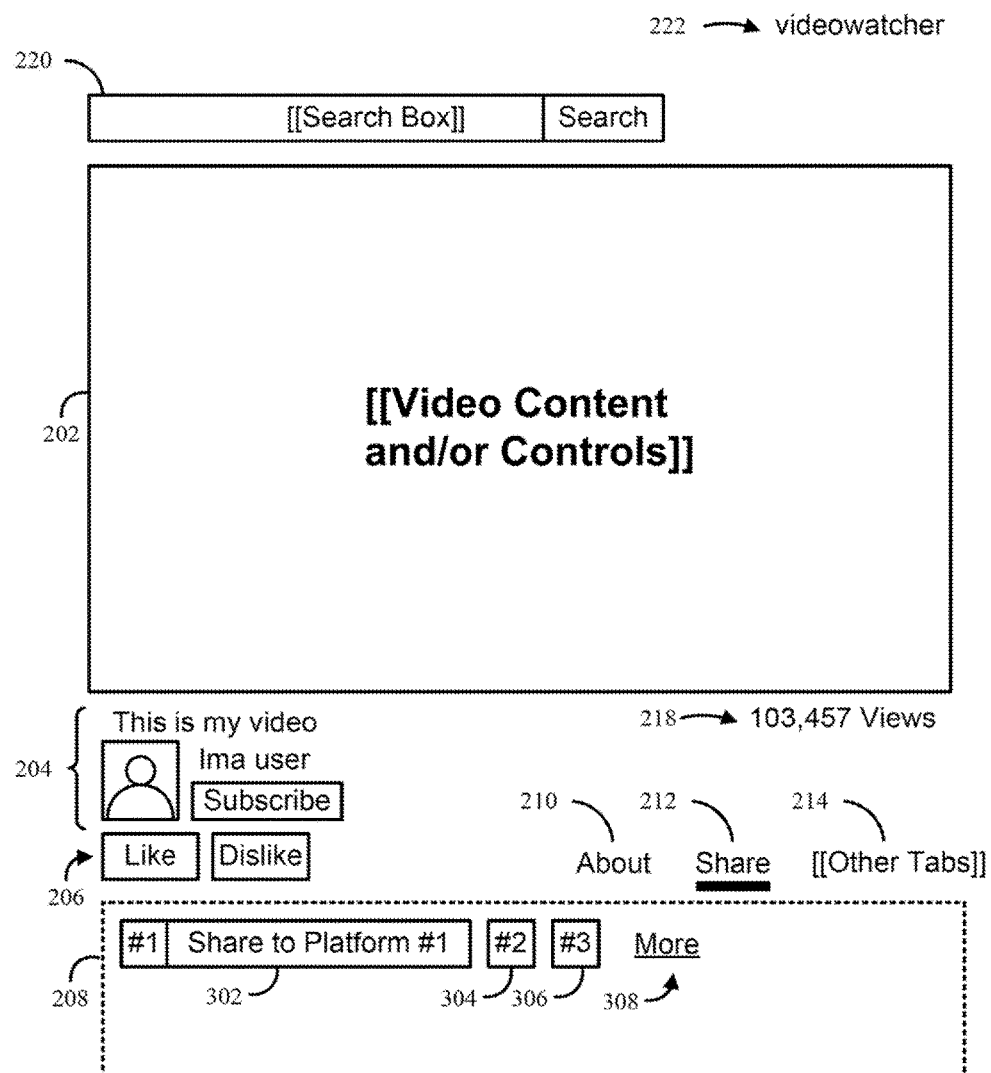

FIG. 3 shows an example 300 of a customized user interface that includes a promotional share element in a sharing portion of user interface 300 in accordance with some embodiments of the disclosed subject matter. As shown in FIG. 3, user interface 300 can include many elements similar to those described in connection with user interface 200 described above in connection with FIGS. 2A-2C. User interface 300 can include a promotional share element 302 in additional information area 208 in which share tab 212 is selected. As described above in connection with FIG. 1, promotional share element 302 can be presented based on whether a request for the media content being presented in media presentation portion 202 was the result of selection of a shared link from the platform associated with promotional share element 302. For example, if process 100 determines at 106 and/or 110 that a request for the media content to be presented in media presentation portion 202 is received from a shared link on a particular platform (e.g., platform #1), process 100 can cause promotional share element 302 to be presented as part of user interface 200 for presenting the requested media content. In some embodiments, promotional share element 302 can have a similar format and function similarly to promotional share element 226. Additionally, additional information area 208 can include share elements 304 and 306 for initiating sharing to other platforms other than the platform. Additionally, a user interface element 308 can be presented for causing additional share elements other than share elements 302-306 to be presented (e.g., if the user would prefer to share to a platform other than platforms corresponding to share elements 302-306).

As described above in connection with FIG. 1, upon determining that a request to present the media content being presented in media presentation portion 202 of user interface 300 is received as the result of selection of a shared link from a platform, such as platform #1, share tab 212 can automatically be presented to the user (e.g., rather than presenting about tab 210), and promotional share element 302 can be presented prominently among any share elements that are presented. Alternatively, share tab 212 can be automatically presented to the user at some time other than upon loading the media content (e.g., media content requested at 102), when a user may be more likely to be interested in sharing content (e.g., after the user has consumed the media content and determined whether to share the media content with others).

Figure 4:
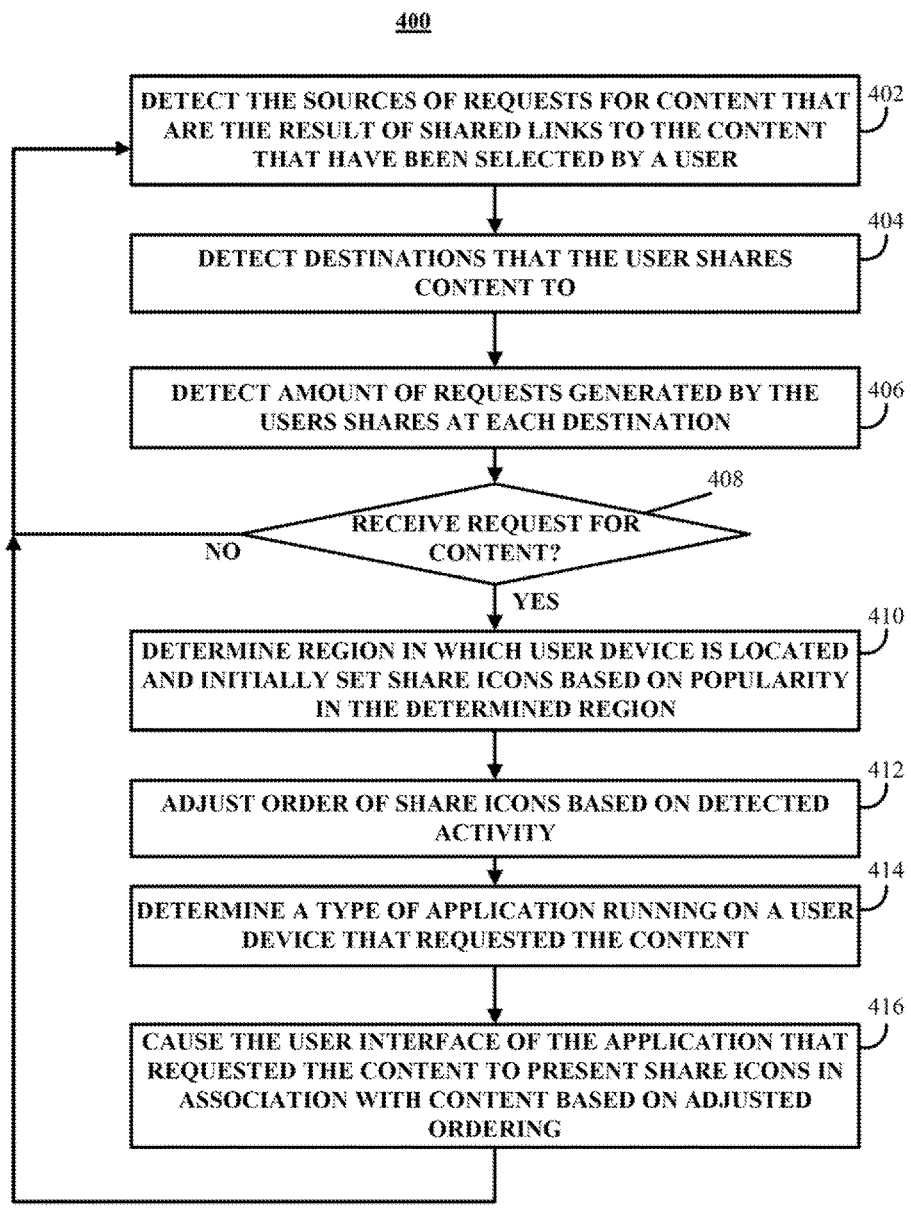
FIG. 4 shows an example of another process for presenting a customized user interface based on user actions in accordance with some embodiments of the disclosed subject matter.

FIG. 4 shows an example 400 of a process for presenting a customized user interface based on past user actions in accordance with some embodiments of the disclosed subject matter. As shown in FIG. 4, process 400 can detect the sources of requests for content that are the result of shared links to the content that have been selected by a user at 402. Requests for content can be detected for one or more related media content platforms. As described above in connection with FIG. 1, a media content platform can cause media content to be presented to a user in response to a request for particular content. In some embodiments, requests to a particular media content platform can be detected for a particular user and/or user device to determine what platforms that user and/or user device is most often requesting content from. In some embodiments, a user can be identified based on one or more criterion such as, the user being signed in to the media content platform, a device identification (device ID) associated with a user device that requested the content, an application identification (app ID) corresponding to a particular instance of an application that caused the request for content to be sent by the device. Additionally or alternatively, a user device can be identified based on one or more criterion, such as an Internet Protocol address (IP address) of the user device, a media access control address (MAC address) of the user device, or any other suitable criterion. In some embodiments, the detecting can be done for multiple related media content platforms. For example, if a user requests content from related media content platforms, requests to these related platforms can each be detected and the results can be aggregated across platforms, analyzed separately, or any combination of detecting data can be analyzed together. Two or more media content platforms can be related, for example, if they are owned by the same company, if a user can sign in to them using the same login information, or if they are related in any other suitable way.

In some embodiments, each time a request for content is received from a user device from an external source (e.g., requests that are not the result of a selection of media content within the media content platform), process 400 can determine whether the source of the request is a shared link on a platform to which users can share media content. Any suitable technique or techniques can be used to determine whether the source of a request is a shared link. For example, any of the techniques described above in connection with 106 and/or 110 of FIG. 1 can be used to determine a source of a request and whether the source is a platform that links can be shared to (e.g., a platform that corresponds to a share element presented in a user interface of the media content platform).

In some embodiments, if process 400 determines that the request for content is the result of the user selecting a shared link from the media content platform (e.g., using a share element of a user interface of the media content platform), the source of the request can be logged. Logging of the sources of incoming requests can be performed using any suitable technique or techniques. For example, when process 400 determines that the source of an incoming request is a shared link on a particular platform, process 400 can cause a cookie on the user device to be stored and/or updated to reflect the determination. As another example, when process 400 determines that the source of an incoming request is a shared link on a particular platform, process 400 can cause the information to be stored in a database in association with information identifying the user and/or the user device. More particularly, the information can be stored in association with information derived from user information or user device information, such as a one-way hash of the information, such that the stored information cannot be identified with a particular user without the information used to generate the hash being used as an input.

At 404, process 400 can detect destinations that the user shares content to. In some embodiments, process 400 can determine what platform a user shares media content to, when a user shares media content by, for example, initiating sharing using a share element. Each time the user shares content to a platform using such a share element, process 400 can log which platform or platforms the media content was shared to. As described above in connection with 402, this logging can be performed using any suitable technique or techniques.

At 406, process 400 can detect an amount of requests generated by shares from the user at each destination. In some embodiments, a unique URL or other address used to access media content can be generated when a user shares content. This unique address can be associated with the user and/or user device that caused the content to be shared. Each time a request for content is received at the unique address, this information can be logged in association with the user information associated with the unique address. Additionally, a source of the incoming request (e.g., a source of the platform) can also be logged. This can allow for requests that are the result of sharing by the user to be attributed to the user. Additionally, in some embodiments, each time an incoming request is received at the unique address, a source of the incoming request can be determined (e.g., as described above in connection with 106 and/or 110 of FIG. 1). As described above in connection with 402, this logging can be performed using any suitable technique or techniques.

In some embodiments, the information detected and/or collected at 402-406 can expire and/or be overwritten. Any suitable criteria can be used in determining whether information has expired or whether it should be overwritten. For example, each piece of logged information can expire after a predetermined period of time (e.g., one day, two weeks, one month, six months, etc.). Additionally or alternatively, a limited amount of the most recently logged information can be maintained. For example, after a predetermined amount of logged information is collected for any user and/or user device for each type of action that is logged (e.g., incoming requests, shares to platforms, attributions), the oldest information can be overwritten when new information is logged. As another example, duplicate information can be overwritten (e.g., when a user shares media content to a particular platform, previously logged information indicating that the user shared media content to that platform can be overwritten). As still another example, the number of platforms for which information is logged can be limited to the maximum number of share elements that can be presented to the user in a user interface of the media content platform. In a more particular example, if the maximum number of share elements presented by the user interface of the media content platform is ten, then information detected and/or collected at 402-406 for the last ten platforms can be stored, and information detected and/or collected for other platforms can be deleted and/or overwritten. Any suitable amount of information can be logged at any particular time, and can vary depending on the type of action being logged. In some embodiments, allowing the logged information to expire and/or overwriting the oldest logged information can inhibit older logged information that may not reflect a user's current preferences from affecting which platforms the user is encouraged to share content to.

At 408, process 400 can determine whether a request for content has been received from a user device associated with the user. If process 400 determines that a request for content has not been received ("NO" at 408), process 400 can return to 402-406 and continue detecting user activity. Otherwise, if process 400 determines that a request for content has been received ("YES" at 408), process 400 can proceed to 410.

At 410, process 400 can determine a region in which the user device that requested the content is located, and based on the region that is determined, initially set an order of share elements to present to the user based on the popularity of each platform in the region. Any suitable technique or techniques can be used to identify a region in which the user device is located. For example, an IP address of the user device can be used to determine a region where the device is located based on a determination of a location to which the IP address has been assigned. As another example, location information determined by the user device (e.g., based on global positioning system (GPS) data, or similar data) can be received to determine a region where the user device is located. As yet another example, if the user is logged in, location information associated with the user's account can be retrieved to determine a region associated with the user. In some embodiments, areas can be divided into regions using any suitable criteria, such as based on international borders, spoken and/or written language, cultural identity, or any other suitable criteria.

In some embodiments, after the region of the user device that requested the content is determined, an initial order in which share elements corresponding to different platforms are to be presented can be set according to the popularity of the platforms in the identified region. Any suitable criterion or criteria can be used to determine the popularity of the platforms in each region, such as: the total number of unique users of each platform in the region; a total number of visits to each platform in the region; the number of requests for content from the media platform that originate from each of the platforms in each region; and/or any other suitable criteria.

At 412, process 400 can adjust an order of presentation of the share elements based at least in part on the detected activity at 402-406. In some embodiments, the information logged at 402-406 can be used to determine an order of presentation according to a predetermined iterative set of rules. For example, starting from the ordering determined based on the region associated with the user device at 408, process 400 can determine the order by moving a platform to which the user most recently shared content to a first position, then moving a platform from which the user most recently requested content (e.g., a platform that was a most recent referring platform) to a second position if it is different than the platform already in the first position, then moving a platform with the most requests attributable to shares by the user to the first position if it is different than the platform already in the first position, then moving a platform related to the media content platform (e.g., a social networking service owned by the same company that owns the media content platform) to the first position if different than the platform in the first position and if the user is signed in to the related platform. In such an example, the remaining share elements (e.g., share elements that have not been moved) can be left in the order determined based on the region associated with the user. In some embodiments, after setting a first subset of the share elements, a next position can be assigned based on a platform that the user shared to second most recently, placing a platform that the user was referred from second most recently in a next position, and so on. Any other suitable set of rules can be used and can depend on the importance assigned to each activity by an administrator.

Additionally or alternatively, in some embodiments, a score can be generated for each platform based on the user actions detected and/or logged at 402-406. In such embodiments, weights can be assigned differently for different activities (e.g., requests from platforms, shares to platforms, attributions associated with platforms) and/or weights can be based the age of the logged activities with more recent activity being weighted as more important. For example, attributions associated with a particular platform can be weighted more highly than requests generated from a platform, because attributions can indicate a likelihood that content shared by the user will be requested by others. As another example, more recent activity can be weighted more highly than older activity, because it can account for changing behavior of the user over time. In some embodiments, a weight can be based on the number of items shared to a platform (e.g., based on activity detected at 404) compared with the number of requests generated from that platform that are attributable to the user.

At 414, process 400 can determine a type of application running on the user device that requested the content. For example, as described above in connection with 104 of FIG. 1, process 400 can determine a type of application that caused the request to be sent (e.g., whether the application is a full feature browser, a mobile browser, an application associated with the media content platform, etc.).

At 416, process 400 can cause the user interface of the application that requested the content to present share elements in association with the content based on the adjusted ordering. For example, in some embodiments, instructions can be sent to the application as described above in connection with 116 of FIG. 1. In some embodiments, the share elements can be presented as icons that include a logo of the platform to which the share element initiates sharing. Additionally or alternatively, a subset of the share elements can be presented in a top level of a user interface of the media content platform, and a second subset of the share elements can be presented in a share portion of the user interface.

After causing the user interface to present the icons based on the adjusted ordering, process 400 can return to 402 to continue detecting the user activity.

Figure 5:
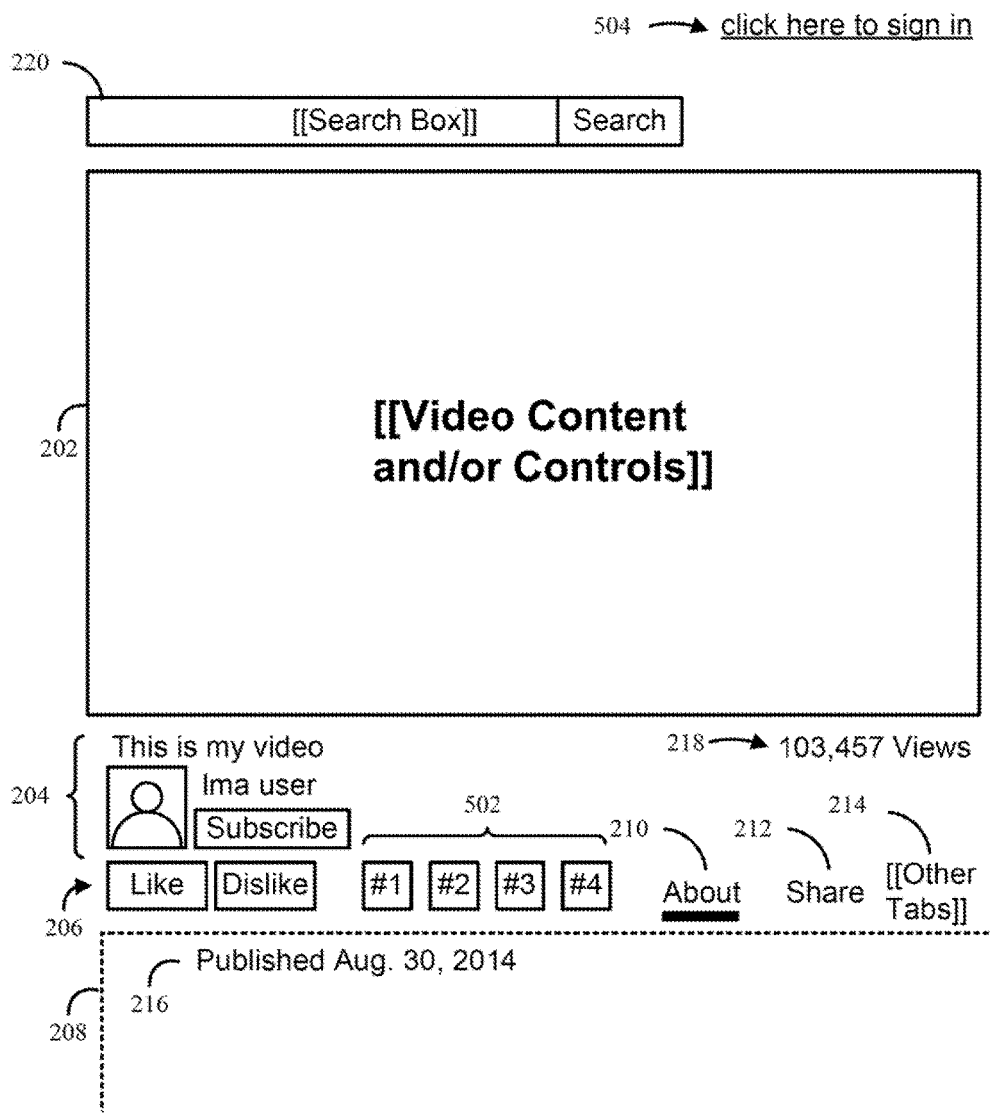
FIGS. 5 and 6 show examples of a customized user interface to be presented based on user actions as a result of the process of FIG. 4 in accordance with some embodiments of the disclosed subject matter.

FIG. 5 shows an example 500 of a customized user interface that includes share elements presented at a top level of the user interface (e.g., not hidden in the share tab) in accordance with some embodiments of the disclosed subject matter. As shown in FIG. 5, user interface 500 can include many elements similar to those described in connection with user interfaces 200 and 300 described above in connection with FIGS. 2A-2C and 3, respectively. As shown in FIG. 5, share elements 502 can be presented in a top level of user interface 500. Although share elements 502 are shown as being presented in proximity to rating user interface elements 206, such share elements can be presented at any suitable location within user interface 500. Additionally, although four share elements are shown as being presented in the top level of user interface 500, any suitable number of share elements can be presented in the top level of user interface 500.

In FIG. 5, the numbers (e.g., #1, #2, etc.) associated with share elements 502 can indicate the popularity of the platforms associated with share elements 502. In some cases, the order that share elements 502 are presented can be based on the popularity in the region determined at 410. For example, where the user is visiting the media content platform for the first time, in cases where the user is not signed in (e.g., as indicated by a message 504 instructing the user to "click here to sign in"), where logged detecting activity has been cleared (e.g., by a user clearing cookies associated with the browser that requested the media content), or in any other suitable cases. As described above in connection with promotional share element 226 of FIG. 2A and share elements 302-306 of FIG. 3, selection of one of share elements 502 can initiate sharing to a platform associated with the user interface element that is selected.

Figure 6:
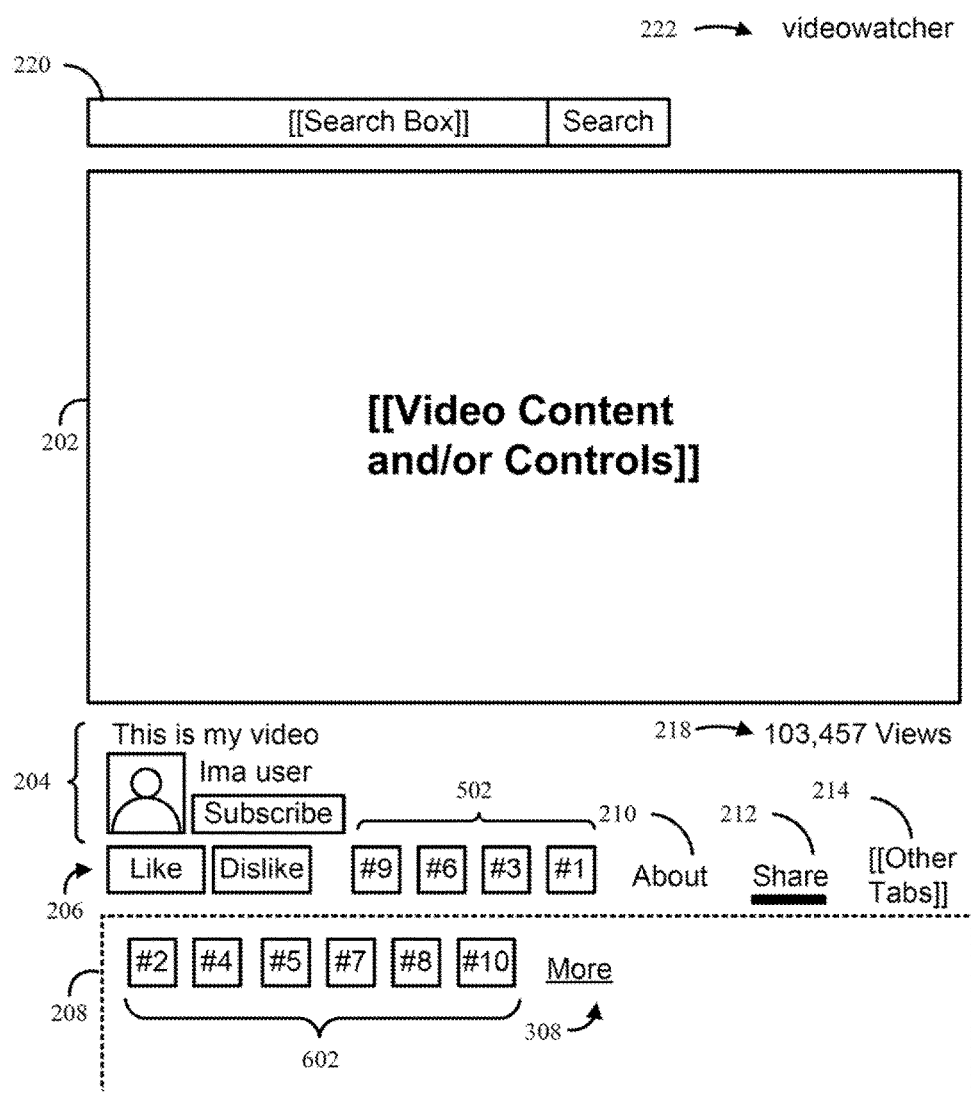

FIG. 6 shows an example 600 of a customized user interface that includes share elements presented at a top level and additional share elements presented in a share portion of the user interface in accordance with some embodiments of the disclosed subject matter. As shown in FIG. 6, user interface 600 can include many elements similar to those described in connection with user interfaces 200, 300 and 500 as described above in connection with FIGS. 2A-2C, 3 and 5, respectively. In some embodiments, an order in which share elements 502 are presented can be based on an order determined at 412 as described above in connection with FIG. 4. For example, platform #9 can be first because it is related to the media content platform presenting media content in media presentation portion 202. As another example, platform #6 can be second because it is the platform with the most request attributable to links shared by the user (e.g., the user signed in as "videowatcher" at 222). Additionally or alternatively, the order of share elements 502 can be based on weights assigned to different activities associated with the user that are detected as described above in connection with 402-406 of FIG. 4.

In some embodiments, additional share elements 602 can be presented in a share portion of user interface 600 (e.g., accessible by selecting share tab 212, presented automatically when the user has reached the end of the media content presented in media presentation portion 202, or at any other suitable time) as described above in connection with FIG. 2. In such embodiments, an order in which additional share elements 602 are presented can be based on any suitable criteria. For example, as shown in FIG. 6, additional share elements 602 can be presented based on popularity (e.g., popularity in the region as determined at 410 as described above). Alternatively, process 400 can be used to assign an order for additional share elements 600, in addition to determining the order for share elements 502 (e.g., based on detected user actions).

In some embodiments, process 100 and process 400 can both be used to generate a customized user interface based on user actions. For example, share elements (e.g., share elements 502) can be presented in a top level of a user interface, and a promotional share element (e.g., promotional share element 226) can be presented in a common user interface.

Figure 7:
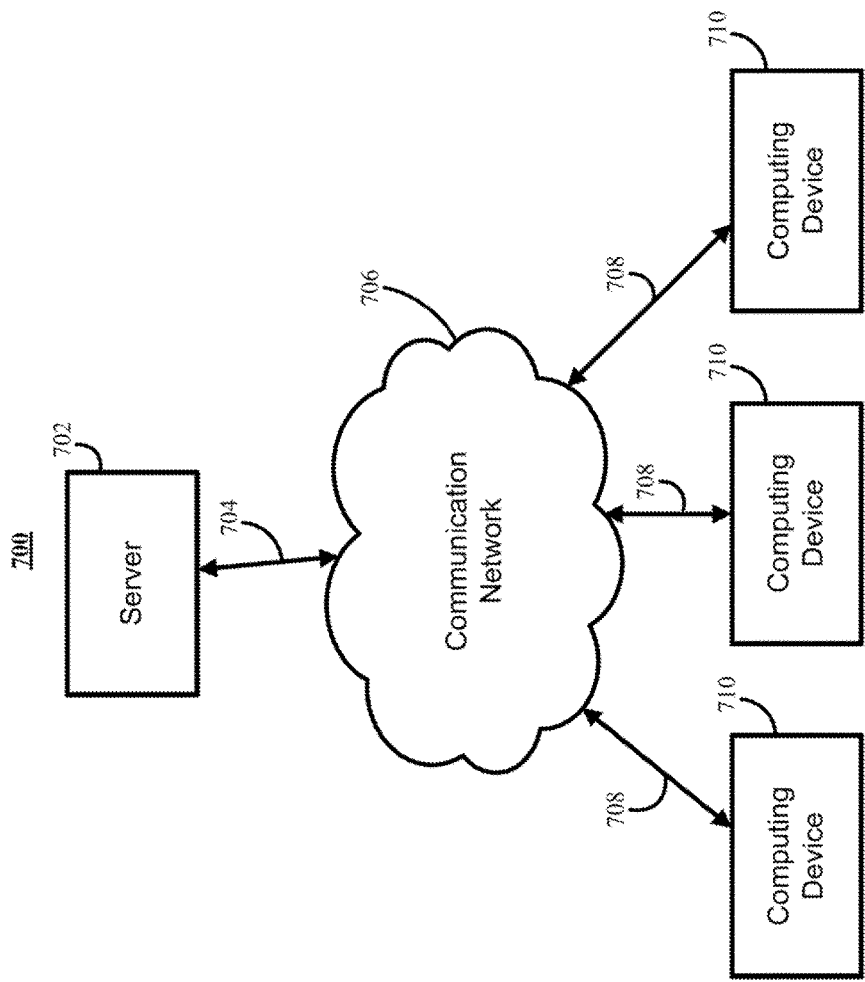
FIG. 7 shows a schematic diagram of an illustrative system suitable for embodiment of mechanisms described herein for presenting a customized user interface based on user actions in accordance with some embodiments of the disclosed subject matter.

FIG. 7 shows an example 700 of a generalized schematic diagram of a system on which the mechanisms for presenting a customized user interface based on user actions as described herein can be implemented in accordance with some embodiments. As illustrated, system 700 can include one or more user devices 710. User devices 710 can be local to each other or remote from each other. User devices 710 can be connected by one or more communications links 708 to a communication network 706 that can be linked to a server 702 via a communications link 704.

System 700 can include one or more servers 702. Server 702 can be any suitable server for providing access to the mechanisms described herein for presenting a customized user interface based on user actions, such as a processor, a computer, a data processing device, or any suitable combination of such devices. For example, the mechanisms for presenting a customized user interface based on user actions can be distributed into multiple backend components and multiple frontend components and/or user interfaces. In a more particular example, backend components, such as mechanisms for receiving requests for media content, user action detecting mechanisms, user interface customization mechanisms, etc., can be performed on one or more servers 702. In another particular example, frontend components, such as presentation of a user interface, initiating requests for media content, initiating sharing of media content, etc., can be performed on one or more user devices 710.

In some embodiments, each of the user devices 710, and server 702 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 710 can be implemented as a personal computer, a laptop computer, a smartphone, a tablet computer, a mobile telephone, a wearable computer, a digital media receiver, a set-top box, a smart television, a home entertainment system, a game console, any other suitable computing device, or any suitable combination thereof.

Communications network 706 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 704 and 708 can be any communications links suitable for communicating data among user devices 710, and server 702, such as network links, dial-up links, wireless links, hard-wired links, any other suitable communications links, or any suitable combination of such links. Note that, in some embodiments, multiple servers 702 can be used to provide access to different mechanisms associated with presenting media content. For example, system 700 can include a media content discovery server 702 that facilitates discovery of media content available from a media content platform using the mechanisms described herein, a media content delivery server 702 that responds to requests for the media content by causing the video content to be presented to a user, a comment server 702 that receives comments associated with particular items of media content and causes at least a portion of the comments to be presented with the particular item of media content, and a customization server 702 that uses the mechanisms described herein to cause a customized user interface that includes a promotional share element and/or reorders an order in which share elements to be presented to a user that requested the particular item of media content based on activity of the user determined using the mechanisms described herein.

Figure 8:
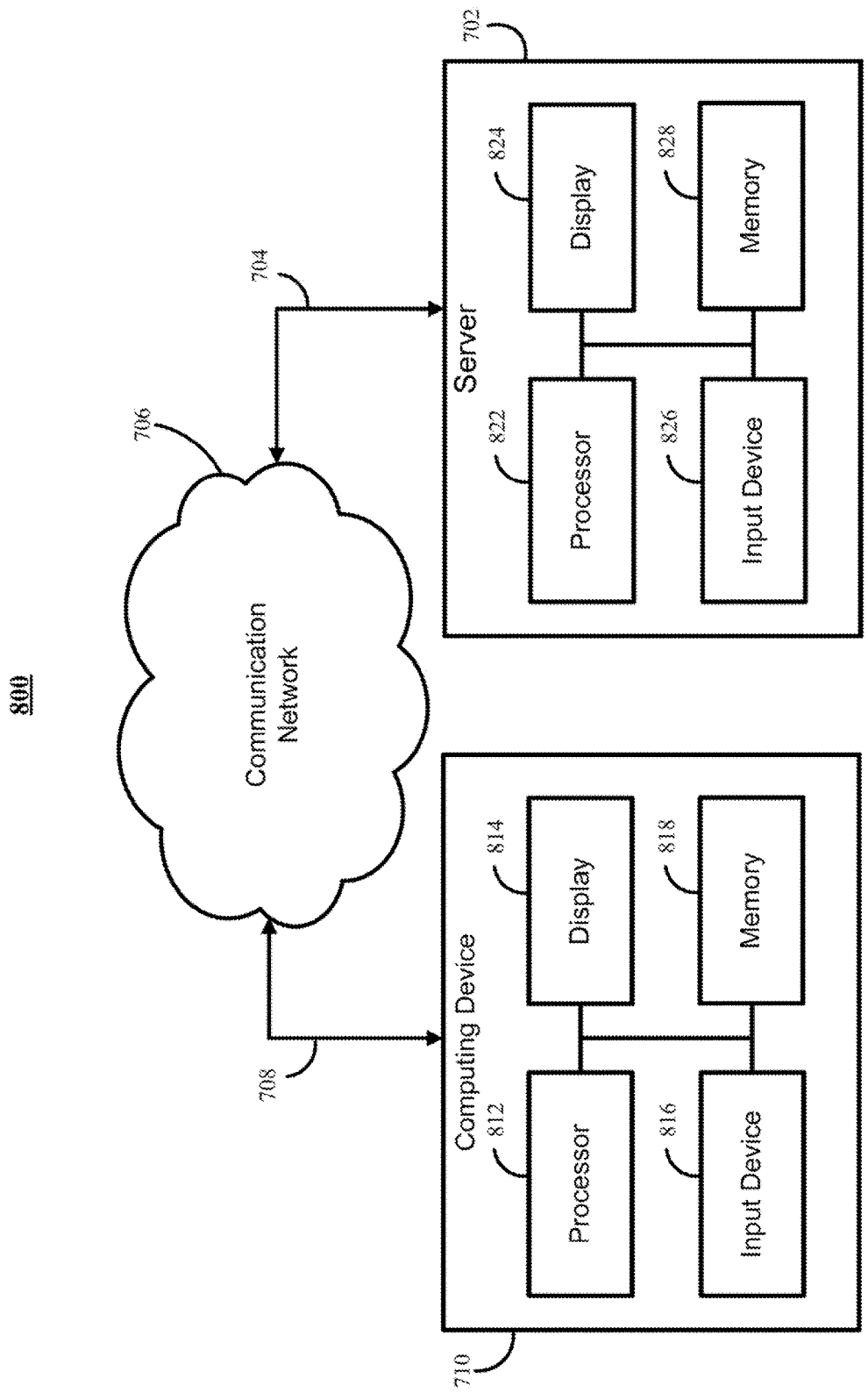
FIG. 8 shows a detailed example of a user device, and a server of FIG. 7 that can be used in accordance with some embodiments of the disclosed subject matter.

FIG. 8 illustrates an example 800 of hardware that can be used to implement one or more of user devices 710, and servers 702 depicted in FIG. 7 in accordance with some embodiments of the disclosed subject matter. Referring to FIG. 8, user device 710 can include a hardware processor 812, a display 814, an input device 816, and memory 818, which can be interconnected. In some embodiments, memory 818 can include a storage device (such as a non-transitory computer-readable medium) for storing a computer program for controlling hardware processor 812. In some embodiments, memory 818 can include a location for storing a cookie as described above in connection with, for example, FIG. 4.

Hardware processor 812 can use the computer program to execute the mechanisms described herein for presenting a customized user interface based on user actions in accordance with instructions received as a result of, for example, process 100 described above in connection with FIG. 1 and/or process 400 described above in connection with FIG. 4, to send and receive data through communications link 708. In some embodiments, hardware processor 812 can send and receive data through communications link 708 or any other communication links using, for example, a transmitter, a receiver, a transmitter/receiver, a transceiver, or any other suitable communication device. Display 814 can include a touchscreen, a flat panel display, a cathode ray tube display, a projector, a speaker or speakers, and/or any other suitable display and/or presentation devices. Input device 816 can be a computer keyboard, a computer mouse, a touchpad, a voice recognition circuit, a touchscreen, and/or any other suitable input device.

Server 702 can include a hardware processor 822, a display 824, an input device 826, and memory 828, which can be interconnected. In some embodiments, memory 828 can include a storage device for storing data received through communications link 704 or through other links. The storage device can further include a server program for controlling hardware processor 822. In some embodiments, memory 828 can include information stored as a result of detecting user activity, and hardware processor 822 can receive requests for media content from user devices 710 and transmit instructions for presenting a customized user interface based on user actions back to a user device 710 that requested the media content.

Hardware processor 822 can use the server program to communicate with user devices 710 as well as provide access to and/or copies of the mechanisms described herein. It should also be noted that data received through communications link 704 or any other communications links can be received from any suitable source. In some embodiments, hardware processor 822 can send and receive data through communications link 704 or any other communication links using, for example, a transmitter, a receiver, a transmitter/receiver, a transceiver, or any other suitable communication device. In some embodiments, hardware processor 822 can receive commands and/or values transmitted by one or more user devices and/or one or more users of server 702, such as a user that makes changes to adjust settings associated with presenting a customized user interface based on user actions. Display 824 can include a touchscreen, a flat panel display, a cathode ray tube display, a projector, a speaker or speakers, and/or any other suitable display and/or presentation devices. Input device 826 can be a computer keyboard, a computer mouse, a touchpad, a voice recognition circuit, a touchscreen, and/or any other suitable input device.

In some embodiments, server 702 can be implemented in one server or can be distributed as any suitable number of servers. For example, multiple servers 702 can be implemented in various locations to increase reliability and/or increase the speed at which the server can communicate with user devices 710. Additionally or alternatively, as described above in connection with FIG. 7, multiple servers 702 can be implemented to perform different tasks associated with the mechanisms described herein.

In some embodiments, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by user device 710, and/or server 702 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about user actions stored on a user device, information about user actions stored on a remote device such as server 702, etc.), or to control whether and/or how to receive instructions from the server to cause a user interface presented to the user to be customized based on user actions. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1 and 4 can be executed or performed in any order or sequence not limited to the order and sequence shown and described in the figures. Also, some of the above steps of the processes of FIGS. 1 and 4 can be executed or performed substantially simultaneously where appropriate or in parallel to reduce latency and processing times. Furthermore, it should be noted that FIGS. 1 and 4 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for presenting a customized user interface based on user actions are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting a customized user interface based on user actions, the method comprising:
   receiving, using a hardware processor, a request for a media content item from an application running on a user device, wherein the application comprises a user interface for presenting the media content item that includes a plurality of user interface elements that each initiate sharing of the media content item to one of a plurality of platforms upon selection of the corresponding user interface element including a first user interface element that initiates sharing of the media content item to a first platform of the plurality of platforms;
   determining that the request was sent from the user device as a result of the user selecting a link to the media content item that was presented in a user interface for presenting the first platform of the plurality of platforms; and
   in response to determining that the request for the media content item was sent as the result of the user selecting the link on the first platform, causing the application to present in the user interface for presenting the media content item a second user interface element that initiates sharing of the media content item to the first platform in response to selection of the second user interface element such that the user interface for presenting the media content item includes two different user interface elements that both initiate sharing of the media content item to the first platform.

2. The method of claim 1, wherein the second user interface element comprises a logo of the first platform.

3. The method of claim 2, wherein the second user interface element comprises text including a name of the first platform.

4. The method of claim 1, wherein the application is a browser application.

5. The method of claim 1, wherein at least one of the plurality of platforms is a social networking service.

6. The method of claim 1, wherein determining that the request was sent from the user device as a result of the user selecting the link on the first platform is based on information in an HTTP header associated with the request.

7. The method of claim 1, further comprising determining an amount of time for which the media content item has been available, and wherein presentation of the second user interface is also based on whether the amount of time is below a predetermined threshold.

8. The method of claim 1, further comprising determining that the user has shared a media content item on the first platform within a predetermined period of time, and wherein presentation of the second user interface based on the determination that the user has shared a media content item on the first platform within the predetermined time period.

9. A system for presenting a customized user interface based on user actions, the system comprising:
a hardware processor programmed to:
receive a request for a media content item from an application running on a user device, wherein the application comprises a user interface for presenting the media content item that includes a plurality of user interface elements that each initiate sharing of the media content item to one of a plurality of platforms upon selection of the corresponding user interface element including a first user interface element that initiates sharing of the media content item to a first platform of the plurality of platforms;
determine that the request was sent from the user device as a result of the user selecting a link to the media content item that was presented in a user interface for presenting the first platform of the plurality of platforms; and
in response to determining that the request for the media content item was sent as the result of the user selecting the link on the first platform, cause the application to present in the user interface for presenting the media content item a second user interface element that initiates sharing of the media content item to the first platform in response to selection of the second user interface element such that the user interface for presenting the media content item includes two different user interface elements that both initiate sharing of the media content item to the first platform.

10. The system of claim 9, wherein the second user interface element comprises a logo of the first platform.

11. The system of claim 10, wherein the second user interface element comprises text including a name of the first platform.

12. The system of claim 9, wherein the application is a browser application.

13. The system of claim 9, wherein at least one of the plurality of platforms is a social networking service.

14. The system of claim 9, wherein the hardware processor is further programmed to determining that the request was sent from the user device as a result of the user selecting the link on the first platform based on information in an HTTP header associated with the request.

15. The system of claim 9, wherein the hardware processor is further programmed to determine an amount of time for which the media content item has been available, and wherein presentation of the second user interface is also based on whether the amount of time is below a predetermined threshold.

16. The system of claim 9, wherein the hardware processor is further programmed to determining that the user has shared a media content item on the first platform within a predetermined period of time, and wherein presentation of the second user interface based on the determination that the user has shared a media content item on the first platform within the predetermined time period.

17. A non-transitory computer-readable medium containing computer executable instructions that, when executed by a processor, cause the processor to perform a method for presenting a customized user interface based on user actions, the method comprising:
receiving a request for a media content item from an application running on a user device, wherein the application comprises a user interface for presenting the media content item that includes a plurality of user interface elements that each initiate sharing of the media content item to one of a plurality of platforms upon selection of the corresponding user interface element including a first user interface element that initiates sharing of the media content item to a first platform of the plurality of platforms;
determining that the request was sent from the user device as a result of the user selecting a link to the media content item that was presented in a user interface for presenting the first platform of the plurality of platforms; and
in response to determining that the request for the media content item was sent as the result of the user selecting the link on the first platform, causing the application to present in the user interface for presenting the media content item second user interface element that initiates sharing of the media content item to the first platform in response to selection of the second user interface element such that the user interface for presenting the media content item includes two different user interface elements that both initiate sharing of the media content item to the first platform.

18. The non-transitory computer-readable medium of claim 17, wherein the second user interface element comprises a logo of the first platform.

19. The non-transitory computer-readable medium of claim 18, wherein the second user interface element comprises text including a name of the first platform.

20. The non-transitory computer-readable medium of claim 17, wherein the application is a browser application.

21. The non-transitory computer-readable medium of claim 17, wherein at least one of the plurality of platforms is a social networking service.

22. The non-transitory computer-readable medium of claim 17, wherein determining that the request was sent from the user device as a result of the user selecting the link on the first platform is based on information in an HTTP header associated with the request.

23. The non-transitory computer-readable medium of claim 17, wherein the method further comprises determining an amount of time for which the media content item has been available, and wherein presentation of the second user interface is also based on whether the amount of time is below a predetermined threshold.

24. The non-transitory computer-readable medium of claim 17, wherein the method further comprises determining that the user has shared a media content item on the first platform within a predetermined period of time, and wherein presentation of the second user interface is also based on the determination that the user has shared a media content item on the first platform within the predetermined time period.

* * * * *